(12) United States Patent  
Kubota

(10) Patent No.: US 8,395,724 B2
(45) Date of Patent: Mar. 12, 2013

(54) DISPLAY DEVICE WITH ILLUMINATOR CONNECTING WITH RELAY, METHOD FOR MANUFACTURING DISPLAY DEVICE, AND ELECTRONIC APPARATUS

(75) Inventor: Takehiko Kubota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 362 days.

(21) Appl. No.: 12/711,785

(22) Filed: Feb. 24, 2010

(65) Prior Publication Data

US 2010/0231822 A1 Sep. 16, 2010

(30) Foreign Application Priority Data

Mar. 11, 2009 (JP) ................................. 2009-057505

(51) Int. Cl.
*G02F 1/1335* (2006.01)
*G02F 1/1345* (2006.01)

(52) U.S. Cl. ................ 349/61; 349/69; 349/70; 349/71; 349/149; 349/152

(58) Field of Classification Search .................... 349/61, 349/63, 69–71, 149–152; 362/29, 31–32, 362/612, 632–634, 626
See application file for complete search history.

(56) References Cited

U.S. PATENT DOCUMENTS

| 6,556,260 | B1 * | 4/2003 | Itou et al. ....................... 349/69 |
| 6,954,239 | B2 * | 10/2005 | Kato et al. ...................... 349/69 |
| 8,023,284 | B2 * | 9/2011 | Sung et al. ..................... 361/807 |
| 2002/0180923 | A1 * | 12/2002 | Aoyagi et al. ................ 349/149 |

FOREIGN PATENT DOCUMENTS

| JP | A-2006-323304 | 11/2006 |
| JP | A-2008-218175 | 9/2008 |

* cited by examiner

*Primary Examiner* — Hoan C Nguyen
(74) *Attorney, Agent, or Firm* — Oliff & Berridge, PLC

(57) ABSTRACT

A display device includes an illumination medium, a display medium, and a conductor. The illumination medium includes a light-emitting element and a connection portion. The light-emitting element includes a first electrode and a second electrode and emits light with the use of power supplied between the first electrode and the second electrode. The connection portion is electrically connected to at least one of the first electrode and the second electrode. The display medium includes a terminal, relay wiring, and an electro-optical element. The relay wiring is electrically connected to the terminal. The electro-optical element controls light that is irradiated by and comes from the illumination medium according to electric energy supplied to the electro-optical element. The conductor electrically connects the relay wiring and the connection portion.

5 Claims, 16 Drawing Sheets

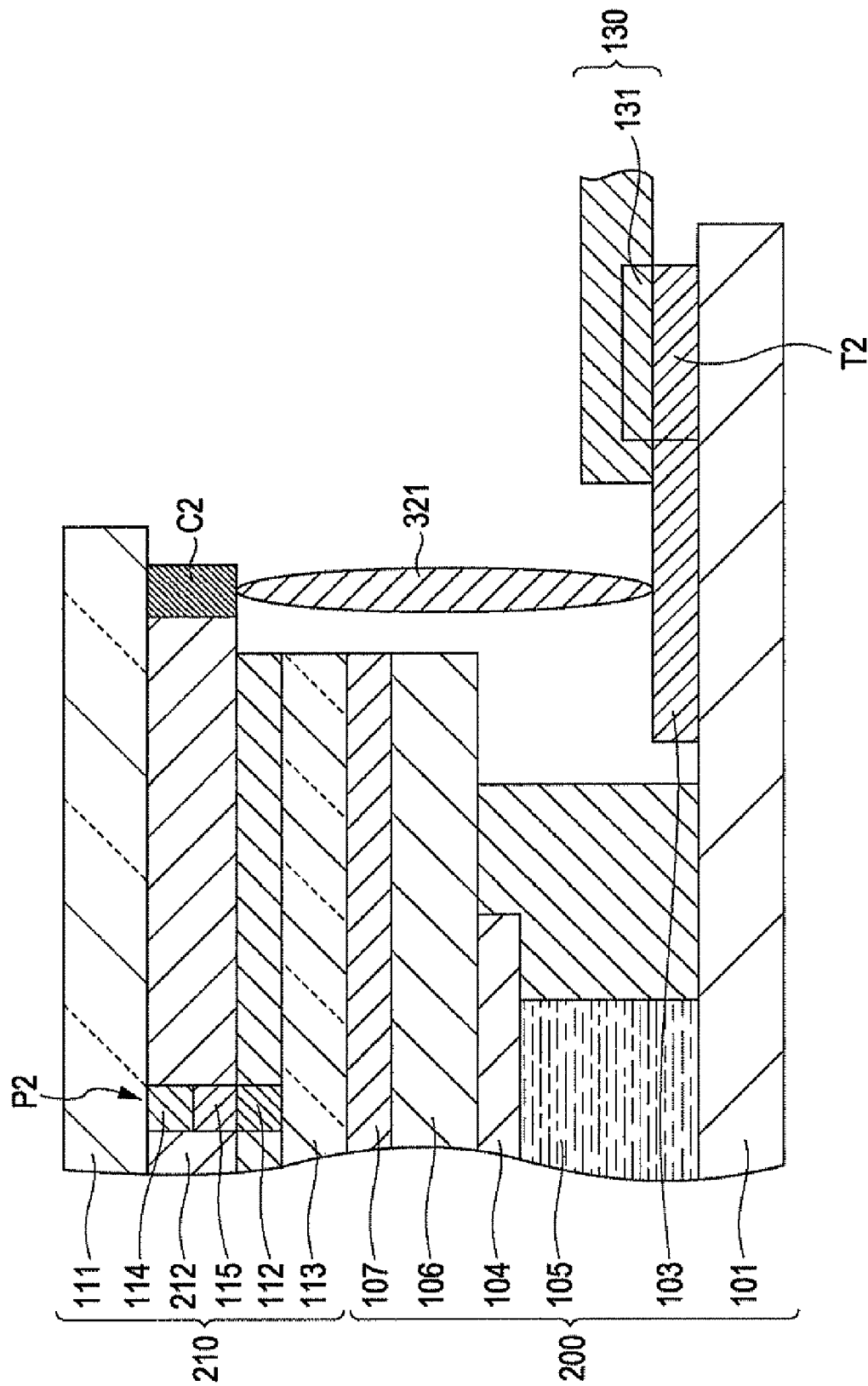

DISPLAY DEVICE WITH ILLUMINATOR CONNECTING WITH RELAY, METHOD FOR MANUFACTURING DISPLAY DEVICE, AND ELECTRONIC APPARATUS

BACKGROUND

1. Technical Field

The present invention relates to a reflection type display device including an illuminator, a method for manufacturing the display device, and an electronic apparatus.

2. Related Art

A reflection type display device with an illumination function that includes a reflective display medium (e.g., reflection type liquid crystal display device) and an illumination medium (e.g., illumination device) is disclosed in JP-A-2006-323304 (refer to FIG. 2). The illumination medium irradiates light to the display medium. In JP-A-2008-218175, an illumination medium (e.g., illumination device) that is a component of a reflection type display device having an illumination function is disclosed (refer to FIG. 10). It is described in these patent documents that organic electroluminescent (EL) elements are used as a light source for an illumination medium. Since an illumination medium irradiates light to a reflective display medium, a reflection type display device having an illumination function is capable of performing gradation display even in the dark.

Neither of JP-A-2006-323304 and JP-A-2008-218175 discloses a method for supplying power to a reflection type display device having an illumination function. As a typical power supply method, it is conceivable to supply power to a display medium and an illumination medium separately with the use of two flexible printed circuits (FPC). Specifically, power is supplied to the display medium such as a reflection type liquid crystal display device or the like through a first FPC, which is connected to the display medium. On the other hand, power is supplied to the illumination medium such as an organic EL device that is provided with organic EL elements or the like through a second FPC, which is connected to the illumination medium. When the above power-supply method is adopted, however, the number of FPCs that are required for a reflection type display device having an illumination function is greater than that for a reflection type display device without an illumination function, that is, a device that does not include an illuminator. The increased number of FPCs that need to be mounted causes an increase in production cost and an increase in the size of the device.

SUMMARY

An advantage of some aspects of the invention is to provide a reflection type display device including an illuminator that does not involve an increase in the number of FPC required. In addition, the invention provides, as an advantage of some aspects thereof, a method for manufacturing the display device, and an electronic apparatus.

In order to address the above-identified problem without any limitation thereto, a display device according to a first aspect of the invention includes: an illumination medium that includes a light-emitting element that includes a first electrode and a second electrode and emits light with the use of power supplied between the first electrode and the second electrode, and a connection portion that is electrically connected to at least one of the first electrode and the second electrode; a display medium that includes a terminal, relay wiring that is electrically connected to the terminal, and an electro-optical element that controls light that is irradiated by and comes from the illumination medium according to electric energy supplied to the electro-optical element; and a conductor that electrically connects the relay wiring and the connection portion. In the operation of a display device according to the first aspect of the invention, power is supplied to the first electrode and the second electrode of the illumination medium through the connection portion, the conductor, the relay wiring, and the terminal. Since the terminal is provided as a component of the display medium, the display device makes it possible to supply power to each power electrode of the illumination medium without any need to connect an FPC to the illumination medium. Therefore, the display device does not involve an increase in the number of FPC required.

In the structure of a display device according to the first aspect of the invention, it is preferable that the illumination medium should further include an illumination substrate on or over which the light-emitting element and the connection portion are formed; and the illumination substrate should be interposed between the connection portion and the relay wiring. In the structure of a display device according to the first aspect of the invention, it is preferable that the illumination medium should further include an illumination substrate on or over which the light-emitting element and the connection portion are formed; the display medium should further include a display substrate on or over which the terminal, the relay wiring, and the electro-optical element are formed; the connection portion should lie on or over a display-medium-side surface of the illumination substrate, which is a surface closer to the display medium; the relay wiring should lie on or over an illumination-medium-side surface of the display substrate, which is a surface closer to the illumination medium; and the connection portion and the relay wiring should face each other with the conductor being sandwiched between the connection portion and the relay wiring. In the latter of the two preferred configurations described above, it is not necessary for the conductor to, for example, extend across and outside an edge face of the illumination substrate circuitously. Such a preferred configuration is advantageous in that the length of a connection path between the relay wiring and the connection portion can be shortened.

In the structure of a display device according to the first aspect of the invention, it is preferable that the number of the conductor should be more than one; the illumination medium should further include an illumination substrate on or over which the light-emitting element and the connection portion are formed; the illumination substrate should have a plurality of edges; the connection portion should include a first connection portion and a second connection portion, the second connection portion being not the same as the first connection portion; the first connection portion should be electrically connected to the relay wiring via one of the conductors that extends across one of the edges of the illumination substrate; and the second connection portion should be electrically connected to the relay wiring via another one of the conductors that extends across another one of the edges of the illumination substrate. Generally, there is a risk of irregular brightness due to a voltage drop in a case where an electrode wire is routed as long wiring in the structure of an illumination medium. In this respect, a display device having such a preferred structure is advantageous in that it is possible to suppress a voltage drop and to reduce uneven brightness even when an electrode wire that is electrically connected to both the first connection portion and the second connection portion is routed as long wiring.

In the structure of a display device according to the first aspect of the invention, it is preferable that the number of the electro-optical element should be more than one; the display medium should further include a common electrode, which is an electrode common to the plurality of electro-optical elements; and the relay wiring should be electrically connected to the common electrode and be used also for supplying power to the electro-optical elements. Or, a display device according to the first aspect of the invention may be preferably configured as follows; the display medium further includes a control circuit that controls electric energy supplied to the electro-optical element; and the relay wiring is electrically connected to the control circuit and is used also for supplying power to the control circuit. In both of the two preferred configurations described above, at least one power line is used for the purpose of supplying power to the illumination medium and supplying power to the display medium, that is, doubles as an illumination power line and a display power line. In addition, at least one power supply is used as both a power supply for the illumination medium and a power supply for the display medium. Such a configuration has an advantage in terms of simple circuitry.

In the structure of a display device according to the first aspect of the invention, it is preferable that the conductor should be made of silver. In a process of manufacturing the display device, the conductor can be formed with the use of conductive paste (e.g., silver paste, which includes silver dissolved in an organic solvent), which is used widely. An electronic apparatus according to a second aspect of the invention is provided with a display device according to the first aspect of the invention.

A method for manufacturing a display device is provided as another aspect of the invention. The display device includes an illumination medium, a display medium, and a conductor. The illumination medium includes a light-emitting element that includes a first electrode and a second electrode and emits light with the use of power supplied between the first electrode and the second electrode, a connection portion that is electrically connected to at least one of the first electrode and the second electrode, and an illumination substrate on or over which the light-emitting element and the connection portion are formed. The display medium includes a terminal, relay wiring that is electrically connected to the terminal, and an electro-optical element that controls light that is irradiated by and comes from the illumination medium according to electric energy supplied to the electro-optical element. The conductor electrically connects the relay wiring and the connection portion. The manufacturing method includes: manufacturing the display medium in such a way as to expose the relay wiring and manufacturing the illumination medium in such a way as to expose the connection portion; attaching the display medium and the illumination medium to each other with the illumination substrate being interposed between the connection portion and the relay wiring; connecting the relay wiring and the connection portion with the use of conductive paste after the attachment of the display medium and the illumination medium to each other; and solidifying the conductive paste to form the conductor.

A method for manufacturing a display device is provided as another aspect of the invention. The display device includes an illumination medium, a display medium, and a conductor. The illumination medium includes a light-emitting element that includes a power electrode and emits light with the use of power supplied to the power electrode, a connection portion that is electrically connected to the power electrode, and an illumination substrate on or over which the light-emitting element and the connection portion are formed. The display medium includes a terminal, relay wiring that is electrically connected to the terminal, an electro-optical element that controls light that is irradiated by and comes from the illumination medium according to electric energy supplied to the electro-optical element, and a display substrate on or over which the terminal, the relay wiring, and the electro-optical element are formed. The conductor electrically connects the relay wiring and the connection portion. The manufacturing method includes: manufacturing the display medium in such a way as to expose the relay wiring and manufacturing the illumination medium in such a way as to expose the connection portion; applying conductive paste to the relay wiring or the connection portion; attaching the display medium and the illumination medium to each other in such a manner that the connection portion lies on or over a display-medium-side surface of the illumination substrate, which is a surface closer to the display medium, the relay wiring lies on or over an illumination-medium-side surface of the display substrate, which is a surface closer to the illumination medium, and the connection portion and the relay wiring face each other with the conductive paste being sandwiched between the connection portion and the relay wiring; and solidifying the conductive paste to form the conductor. With each of the two manufacturing methods described above, it is possible to form a plurality of conductors concurrently. An example of the conductive paste is silver paste.

BRIEF DESCRIPTION OF THE DRAWINGS

The invention will be described with reference to the accompanying drawings, wherein like numbers reference like elements;

FIG. 6 is a set of sectional views that schematically illustrates an example of a method for manufacturing the display device according to the first embodiment of the invention.

FIG. 12 is a sectional view taken along the line XII-XII of FIG. 10;

FIG. 13 is a set of sectional views that schematically illustrates an example of a method for manufacturing the display device according to the third embodiment of the invention.

DETAILED DESCRIPTION OF EMBODIMENTS

Figure 1:
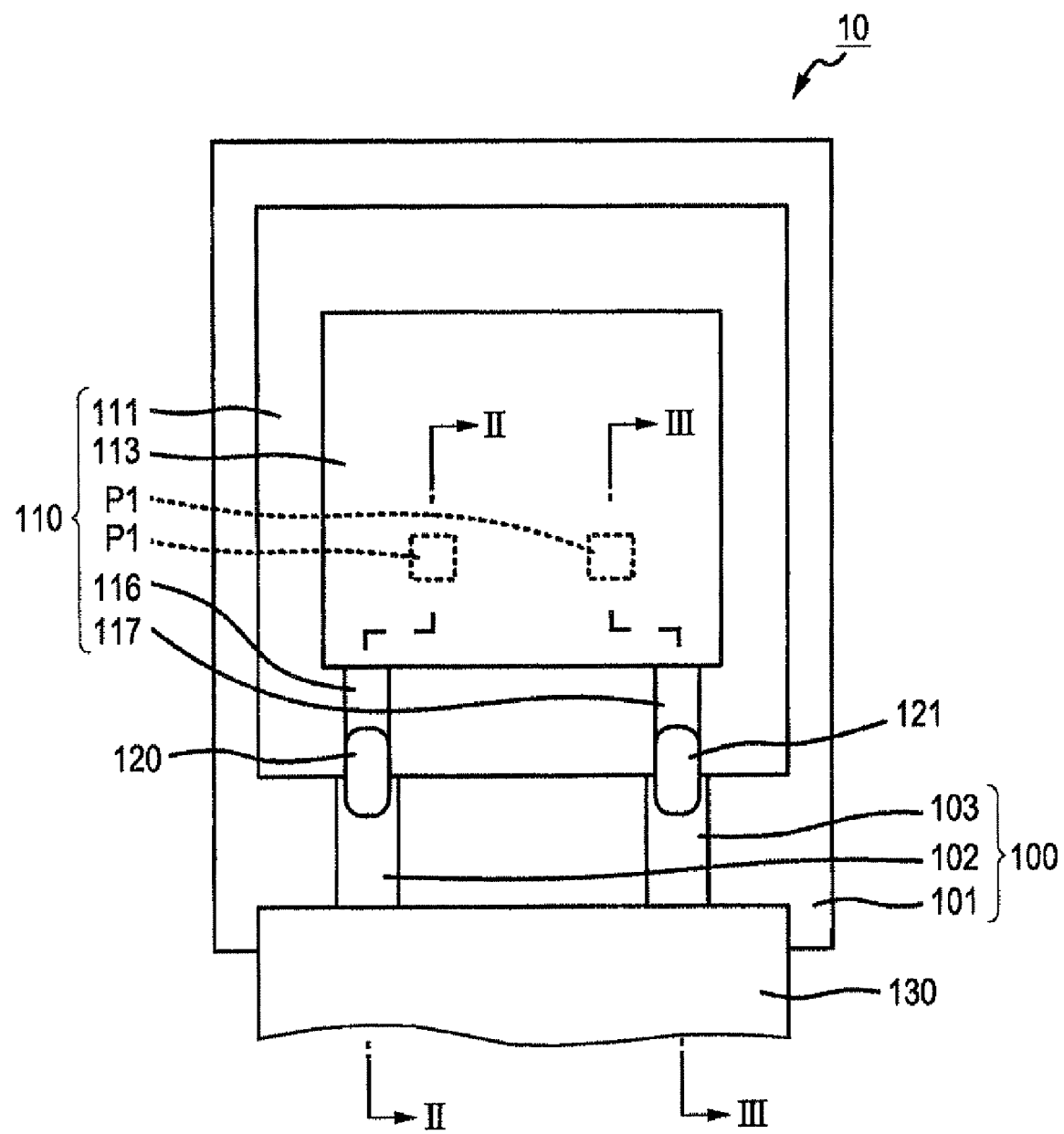
FIG. 1 is a plan view that schematically illustrates an example of the configuration of a display device according to a first embodiment of the invention.

With reference to the accompanying drawings, exemplary embodiments of the invention will now be explained in detail. The dimensions and/or scales of components, parts, members, or other constituent elements illustrated in each of the accompanying drawings are modified from those that will be adopted in actual implementation of the invention where appropriate. Although various specific features are explained in the following exemplary embodiments of the invention, the technical scope of the invention is not limited to the specific embodiments described below. The invention may be modified, altered, changed, adapted, and/or improved without departing from the gist and/or spirit thereof apprehended by a person skilled in the art from explicit and implicit description given herein. In addition, the technical scope of the invention encompasses various modes that can be obtained as a result of the application of the exemplary embodiments, their variations and modifications, and the like. In the accompanying drawings as well as in the following description of this specification, the same reference numerals are consistently used for the same or corresponding components so as to omit redundant explanation or simplify explanation thereof.

First Embodiment

Figure 2:
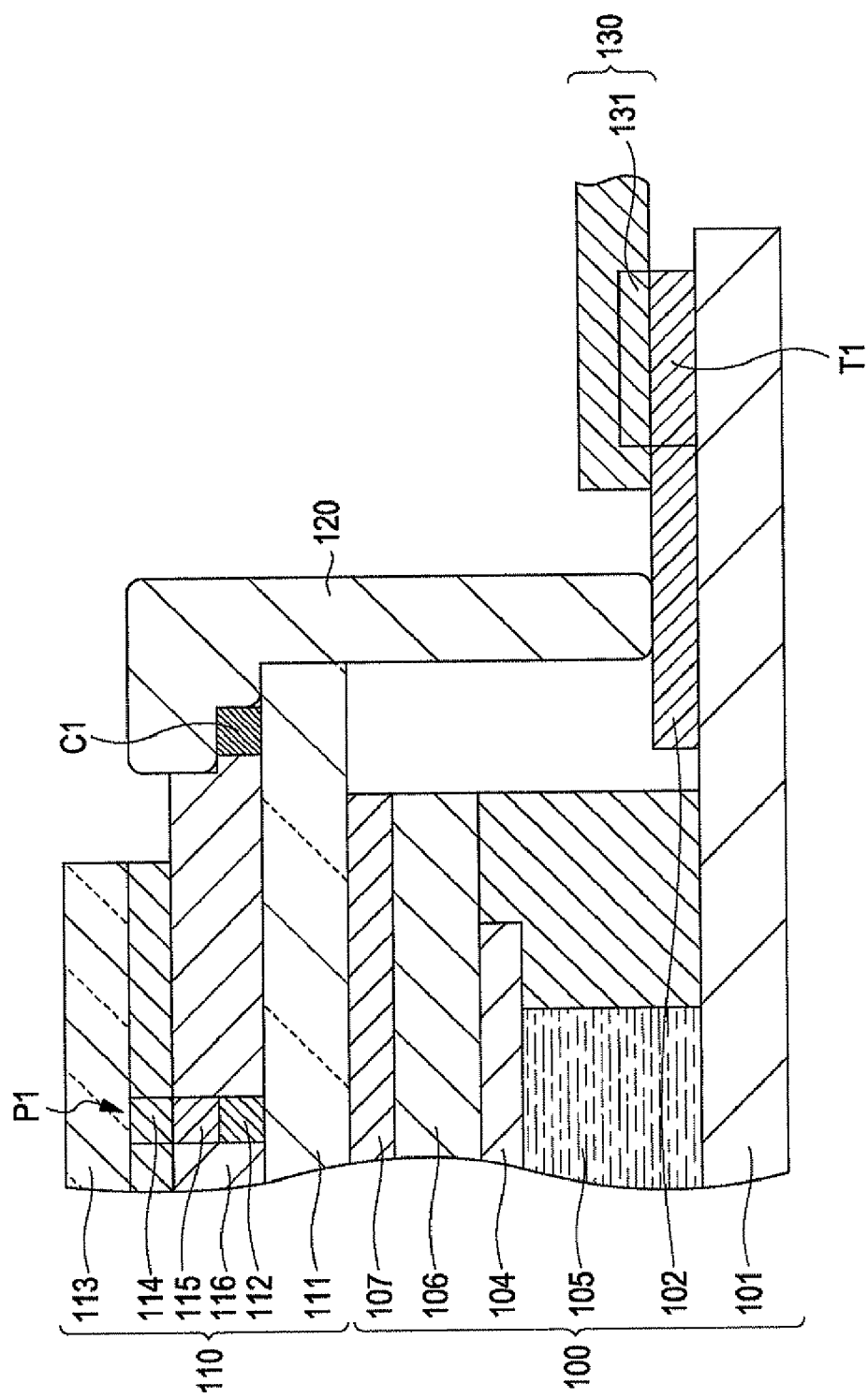
FIG. 2 is a sectional view taken along the line II-II of FIG. 1.
Figure 3:
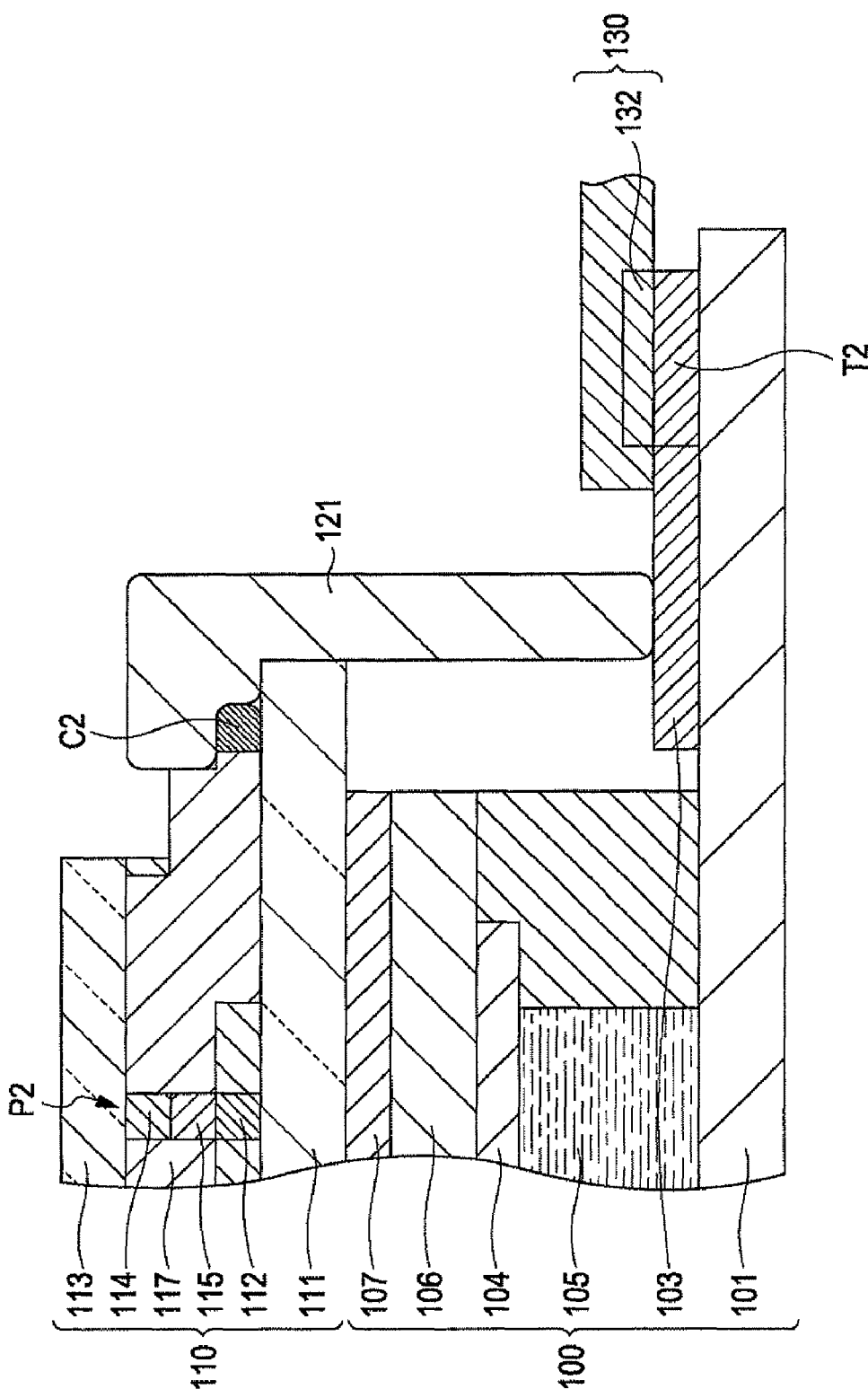
FIG. 3 is a sectional view taken along the line III-III of FIG. 1.

FIG. 1 is a plan view that schematically illustrates an example of the configuration of a display device 10 according to a first embodiment of the invention. FIG. 2 is a sectional view taken along the line II-II of FIG. 1. FIG. 3 is a sectional view taken along the line III-III of FIG. 1. As illustrated in these drawings, the display device 10 is provided with a reflection type display medium 100, an illumination medium (i.e., illuminator) 110, conductive bodies (i.e., electric conductors) 120 and 121, and a flexible printed circuit (FPC) 130. The display medium 100 utilizes reflected light for displaying an image. The illuminator 110 irradiates light to the display medium 100. Each of the electric conductors 120 and 121 provides connection like a bridge between the display medium 100 and the illuminator 110. The FPC 130 is connected to the display medium 100.

The display medium 100 is a reflection type liquid crystal display device. The display medium 100 includes a display substrate 101, a plurality of liquid crystal elements (electro-optical elements) LC formed over the display substrate 101, and control circuits, which are not illustrated in the drawing. Provided for each of the plurality of liquid crystal elements LC, the control circuit controls electric energy supplied to the corresponding liquid crystal element LC. In this way, the control circuit drives the liquid crystal element LC. The liquid crystal element LC is an electro-optical element that performs control on incident light according to a voltage supplied thereto. These liquid crystal elements LC are arranged in a plane over the display substrate 101. The display medium 100 controls a voltage supplied to each liquid crystal element LC so as to control the light transmittance (i.e., light transmission factor) of the liquid crystal element LC. By this means, the display medium 100 causes each liquid crystal element LC to display gradation (i.e., tone).

Figure 4:
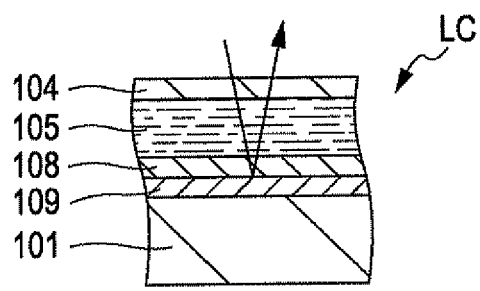
FIG. 4 is a sectional view that schematically illustrates an example of the structure of a liquid crystal element of a display medium, which is a component of the display device according to the first embodiment of the invention.

FIG. 4 is a diagram that schematically illustrates an example of the structure of the liquid crystal element LC. As illustrated in FIG. 4, a reflecting layer 109, which has light reflectivity, is formed on the display substrate 101. The reflecting layer 109 is sandwiched between the liquid crystal element LC and the display substrate 101. The liquid crystal element LC includes a light-transmissive pixel electrode 108, a light-transmissive common electrode 104, and liquid crystal 105. The pixel electrode 108 having optical transparency is formed on the reflecting layer 109. The common electrode 104 having optical transparency is formed over the pixel electrode 108. The liquid crystal 105 is sandwiched between the pixel electrode 108 and the common electrode 104. As its name indicates, the common electrode 104 is an electrode that is common to all of the liquid crystal elements LC.

The light transmission factor of the liquid crystal 105 in the layer thickness direction changes depending on a voltage applied between the common electrode 104 and the pixel electrode 108. When the light transmission factor is sufficiently high, a beam of incident light that enters the common electrode 104 from above in the drawing passes through the common electrode 104, the liquid crystal 105, and the pixel electrode 108 to be reflected at the reflecting layer 109. Then, the reflected light propagates through the pixel electrode 108, the liquid crystal 105, and the common electrode 104.

The illuminator 110 includes a light-transmissive illumination substrate 111 and a plurality of light-emitting elements P1, which is formed on the illumination substrate 111. These light-emitting elements P1 are arranged in a plane over the illumination substrate 111. Among beams of light emitted by each light-emitting element P1, most of the beams propagate toward the display medium 100, that is, propagate downward in FIGS. 2 and 3. The display medium 100 and the illuminator 110 are bonded or attached in another way to each other. In the bonding, the display medium 100 and the illuminator 110 are aligned in such a manner that a planar area in which all of the light-emitting elements P1 are arranged covers a planar area in which all of the liquid crystal elements LC are arranged.

The light-emitting element P1 is an organic electroluminescent (EL) element. As illustrated in FIGS. 2 and 3, the light-emitting element P1 includes a light-transmissive positive electrode (power electrode) 112, a light-transmissive negative electrode (power electrode) 114, and a light-emitting layer 115. The positive electrode 112 is formed on the illumination substrate 111. The negative electrode 114 is formed over the positive electrode 112. The light-emitting layer 115 is sandwiched between the positive electrode 112 and the negative electrode 114. A power potential (i.e., power voltage level) that is supplied to the positive electrode 112 and a power potential that is supplied to the negative electrode 114 are different from each other. The light-emitting layer 115 is made of an organic EL material. The light-emitting layer 115 emits light with brightness that depends on a driving current. That is, each of the light-emitting elements emits light with the use of power supplied between the positive electrode 112 and the negative electrode 114. The light-emitting layer 115 may include a layer that is made of a material other than an organic EL material.

As illustrated in FIGS. 2 and 3, the illuminator 110 includes a connection portion C1, another connection portion C2, a positive electrode wire (i.e., line or wiring) 116, and a negative electrode wire 117, all of which are formed on the illumination substrate 111. The positive electrode wire 116 provides electric connection between the connection portion C1 and each positive electrode 112. The negative electrode wire 117 provides electric connection between the connection portion C2 and each negative electrode 114. On the other hand, the display medium 100 includes a terminal T1, another terminal T2, a relay wire 102, and another relay wire 103. The terminal T1 is electrically connected to the relay wire 102. The terminal T2 is electrically connected to the relay wire 103.

The electric conductor 120 is made of silver. The electric conductor 121 is also made of silver. The electric conductor 120 provides electric connection between the relay wire 102 and the connection portion C1. The electric conductor 121 provides electric connection between the relay wire 103 and the connection portion C2. The display medium 100 and the illuminator 110 are bonded to each other with the illumination substrate 111 being interposed between the connection portion C1 and the relay wire 102. In addition, the display medium 100 and the illuminator 110 are bonded to each other with the illumination substrate 111 being interposed between the connection portion C2 and the relay wire 103. Therefore, as illustrated in FIGS. 2 and 3, respectively, the electric conductors 120 and 121 extend across and outside an edge face of the illumination substrate 111. The FPC 130 has a terminal 131 that is in contact with the terminal T1 and a terminal 132 that is in contact with the terminal T2. That is, the terminal 131 of the FPC 130 is electrically connected to the positive electrode 112. The terminal 132 is electrically connected to the negative electrode 114.

The display medium 100 displays a color image. As illustrated in FIGS. 2 and 3, the display medium 100 includes a color filter (CF) substrate 106, which is formed on the common electrode 104. The display medium 100 further includes a polarizing plate 107, which is formed on the CF substrate 106. On the other hand, the illuminator 110 includes a light-transmissive sealing substrate 113, which is formed on the plurality of light-emitting elements P1. The sealing substrate 113 protects each light-emitting element P1 from degradation due to exposure to moisture, oxygen, and the like. An example of the material of the sealing substrate 113 is glass. The polarizing plate 107 is bonded to the illumination substrate 111 for the attachment of the display medium 100 to the illuminator 110 or vice versa.

Figure 5A:
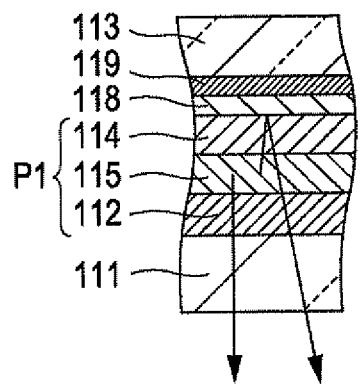
FIGS. 5 (5A, 5B, and 5C) is a set of sectional views that schematically illustrates examples (a), (b), and (c) of the layer structure of a part of an illuminator, which is a component of the display device according to the first embodiment of the invention.
Figure 5B:
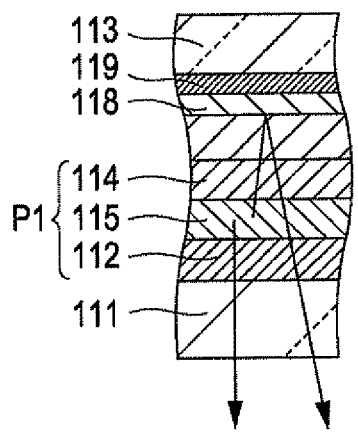
Figure 5C:
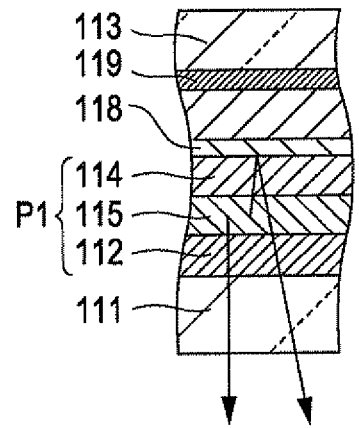

FIG. 5 is a set of sectional views that schematically illustrates examples (a), (b), and (e) (corresponding to FIGS. 5A, 5B, and 5C) of the layer structure of a part of the illuminator 110. Besides the illumination substrate 111, the plurality of light-emitting elements P1, and the sealing substrate 113, the illuminator 110 includes a reflecting layer 118 and a black matrix 119. As illustrated in FIG. 5, the reflecting layer 118 is formed on or over the plurality of light-emitting elements P1. The black matrix 119 is sandwiched between the reflecting layer 118 and the black matrix 119. There are many variations in the layer pattern of the reflecting layer 118 and the black matrix 119. For example, as illustrated in the layer structure example (a) of FIG. 5, the reflecting layer 118 may be formed in contact with the light-emitting element P1 with the black matrix 119 being directly sandwiched between the reflecting layer 118 and the sealing substrate 113. Or, as illustrated in the layer structure example (b), other layer may be sandwiched between the light-emitting element P1 and the reflecting layer 118 with the black matrix 119 being directly sandwiched between the reflecting layer 118 and the sealing substrate 113. Or, as illustrated in the layer structure example (c), the reflecting layer 118 may be formed in contact with the light-emitting element P1 with other layer as well as the black matrix 119 being sandwiched between the reflecting layer 118 and the sealing substrate 113.

As explained above, in the structure of the display device 10, the terminal 131 of the FPC 130 is electrically connected to the positive electrode 112 of the illuminator 110. The terminal 132 of the FPC 130 is electrically connected to the negative electrode 114 of the illuminator 110. Therefore, it is possible to supply a power potential for the positive electrode 112 via the terminal 131 and to supply a power potential for the negative electrode 114 via the terminal 132, thereby driving each light-emitting element P1 for light emission. In other words, it is possible to illuminate the display medium 100 with the use of the illuminator 110 as a result of the supplying of a power potential for the positive electrode 112 via the terminal 131 and a power potential for the negative electrode 114 via the terminal 132. When an organic EL element is used as a light source in a configuration that includes a display medium and an illuminator bonded to each other, an appropriate range of a potential difference between a positive electrode and a negative electrode is from five to ten volts [V].

In addition, in the structure of the display device 10, the relay wire 102 is provided solely for the purpose of connecting the terminal T1 and the electric conductor 120 electrically. In like manner, the relay wire 103 is provided solely for the purpose of connecting the terminal T2 and the electric conductor 121 electrically. This means that each of the relay wires 102 and 103 functions as dedicated wiring that is used only for the purpose of supplying power to the illuminator 110. Even when the potential of such wiring fluctuates, the quality of display performed by the display medium 100 will not be affected. For this reason, for example, even when the display device 10 has a matrix-driven configuration in which all of the light-emitting elements P1 are subjected to matrix driving (e.g., passive-matrix driving), and in addition, even when the potential of power supplied to the illuminator 110 is fluctuated to offset variation/disagreement in characteristics among the plurality of light-emitting elements P1, degradation in display quality does not occur.

Figure 6A:
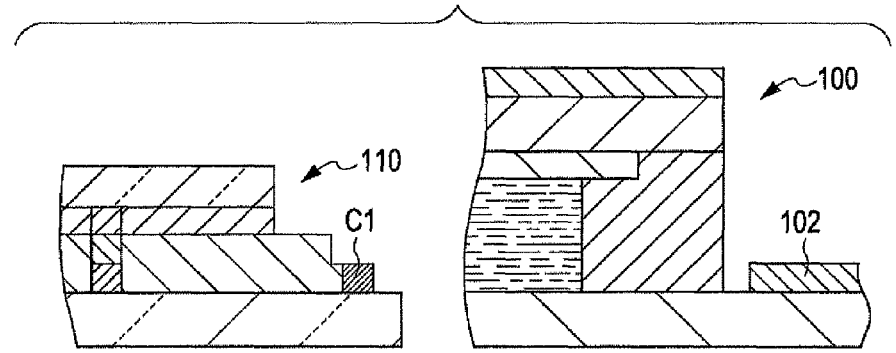
FIGS. 6A, 6B, and 6C show a first process, a second process, and a third process of the manufacturing method, respectively.
Figure 6B:
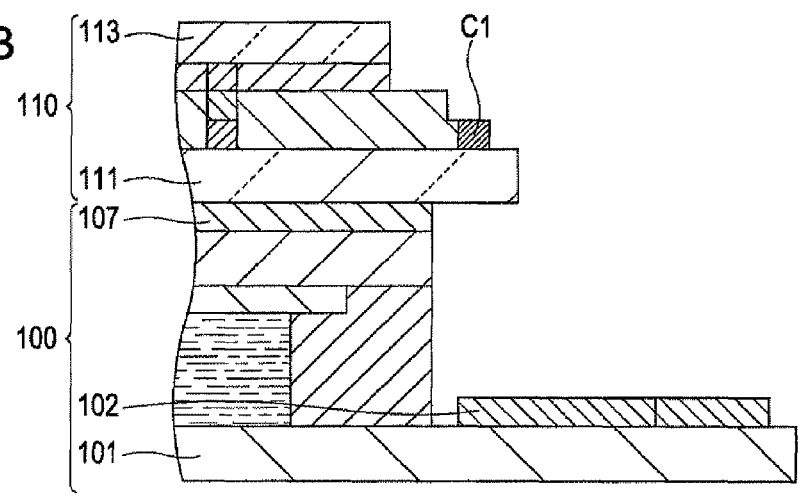
Figure 6C:
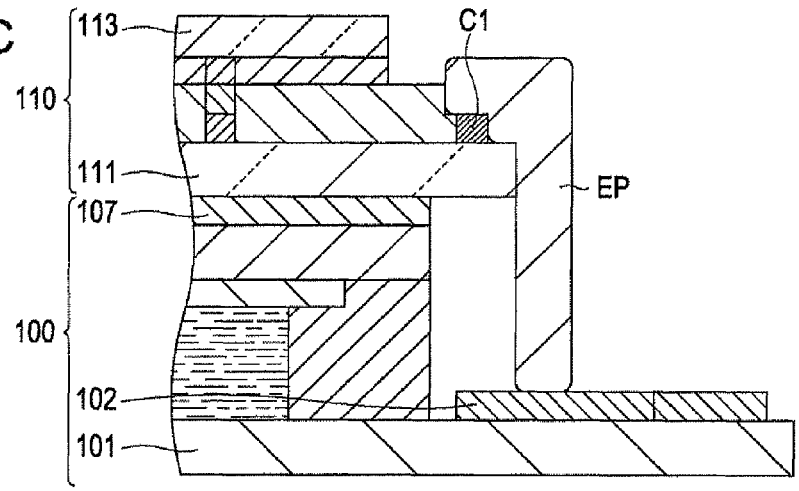

FIG. 6 is a set of sectional views that schematically illustrates an example of a method for manufacturing the display device 10. FIG. 6A shows a first process of the manufacturing method. FIGS. 6B and 6C show a second process and a third process thereof, respectively. Each of the sectional views 6A, 6B, and 6C shows a cross section taken along the line II-II of FIG. 1. In the first process, the display medium 100 is manufactured in such a way as to expose the relay wire 102, the relay wire 103, the terminal T1, and the terminal T2. In addition, in the first step, the illuminator 110 is manufactured in such a way as to expose the connection portions C1 and C2. In the second process, the polarizing plate 107 of the display medium 100 and the illumination substrate 111 of the illuminator 110 are bonded to each other with the illumination substrate 111 being interposed between the connection portion C1 and the relay wire 102 as well as between the connection portion C2 and the relay wire 103. In this way, the display medium 100 and the illuminator 110 are attached to each other.

In the third process, electrically conductive paste EP is applied so as to connect the relay wire 102 and the connection portion C1 and connect the relay wire 103 and the connection portion C2. The conductive paste EP is silver paste, which includes silver dissolved in an organic solvent. In the fourth process, the conductive paste EP is solidified. As a result, the organic solvent is removed. As illustrated in FIGS. 2 and 3, the electric conductors 120 and 121 are formed concurrently. Finally, the FPC 130 is connected to the display medium 100 to bring the terminal 131 into contact with the terminal T1 and the terminal 132 into contact with the terminal T2.

The display device 10 is manufactured through these processes. In the structure of the display device 10, both of the connection portion C1 and the connection portion C2 are provided on a surface of the illumination substrate 111 that is opposite a display-medium-side surface. The display-medium-side surface is a surface that is closer to the display medium 100. Both of the relay wires 102 and 103 are provided on an illuminator-side surface of the display substrate 101, which is a surface that is closer to the illuminator 110. With such a structure, as explained above, it is possible to form the electric conductors 120 and 121 concurrently.

Second Embodiment

Figure 7:
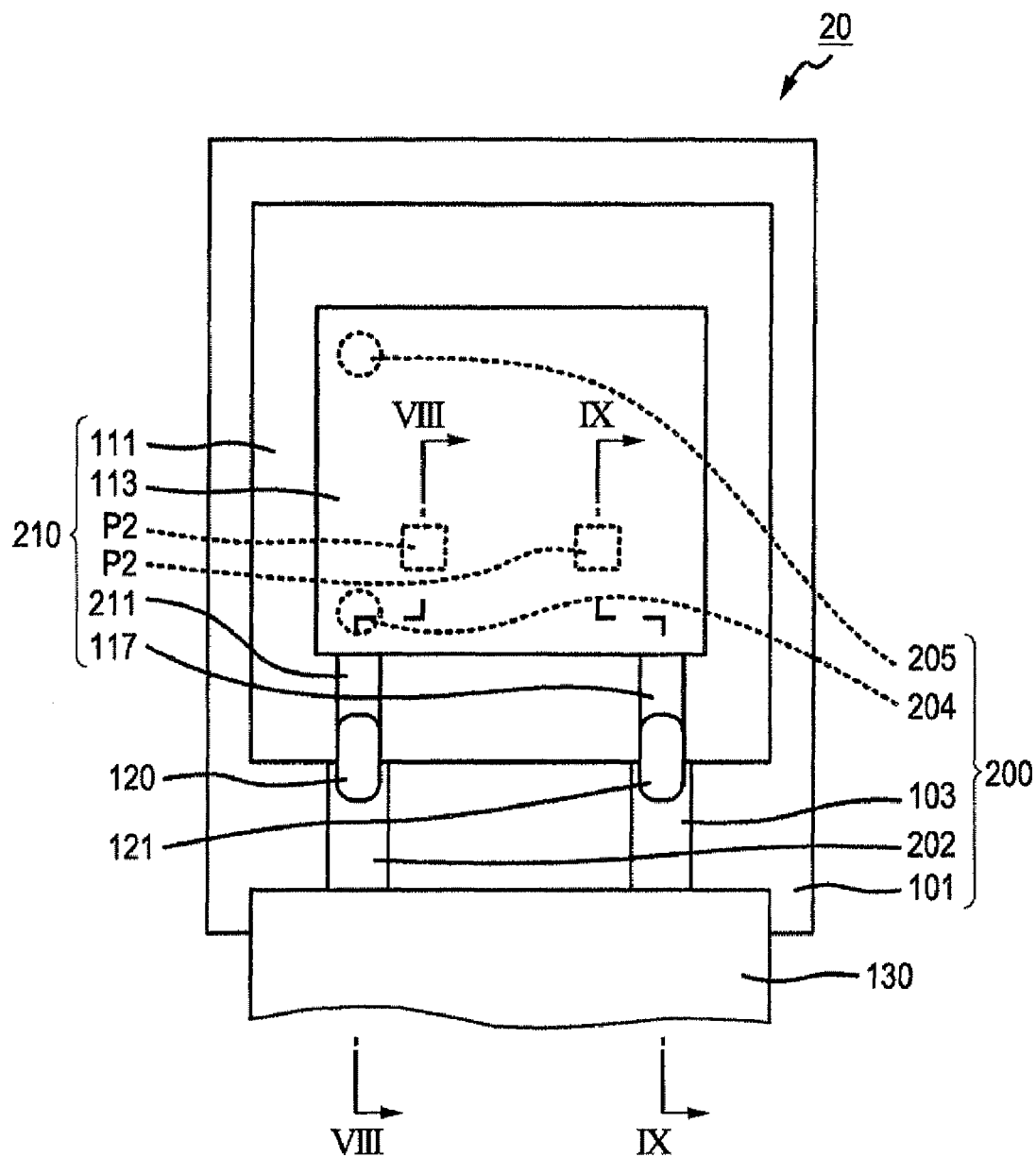
FIG. 7 is a plan view that schematically illustrates an example of the configuration of a display device according to a second embodiment of the invention.
Figure 8:
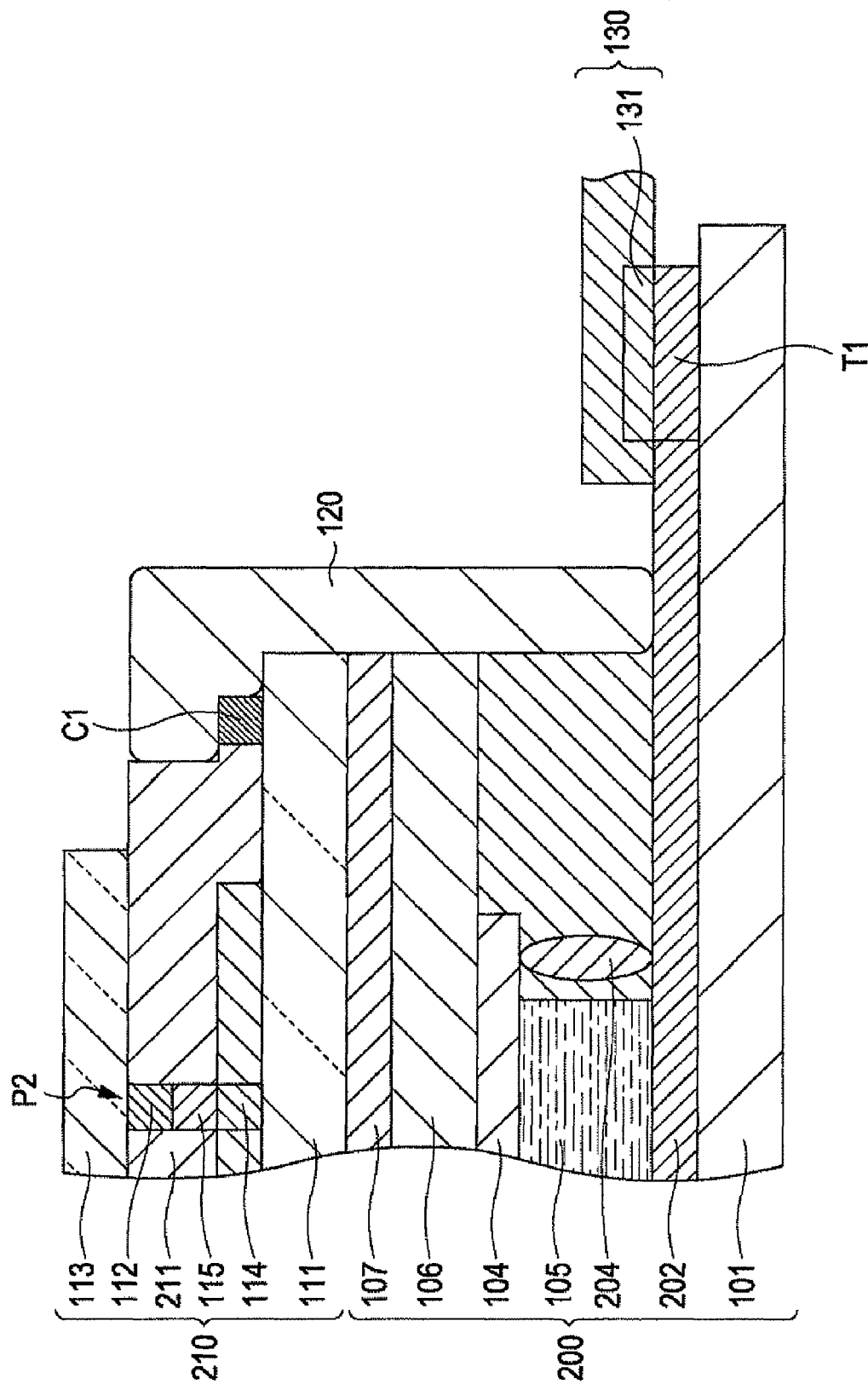
FIG. 8 is a sectional view taken along the line VIII-VIII of FIG. 7.
Figure 9:
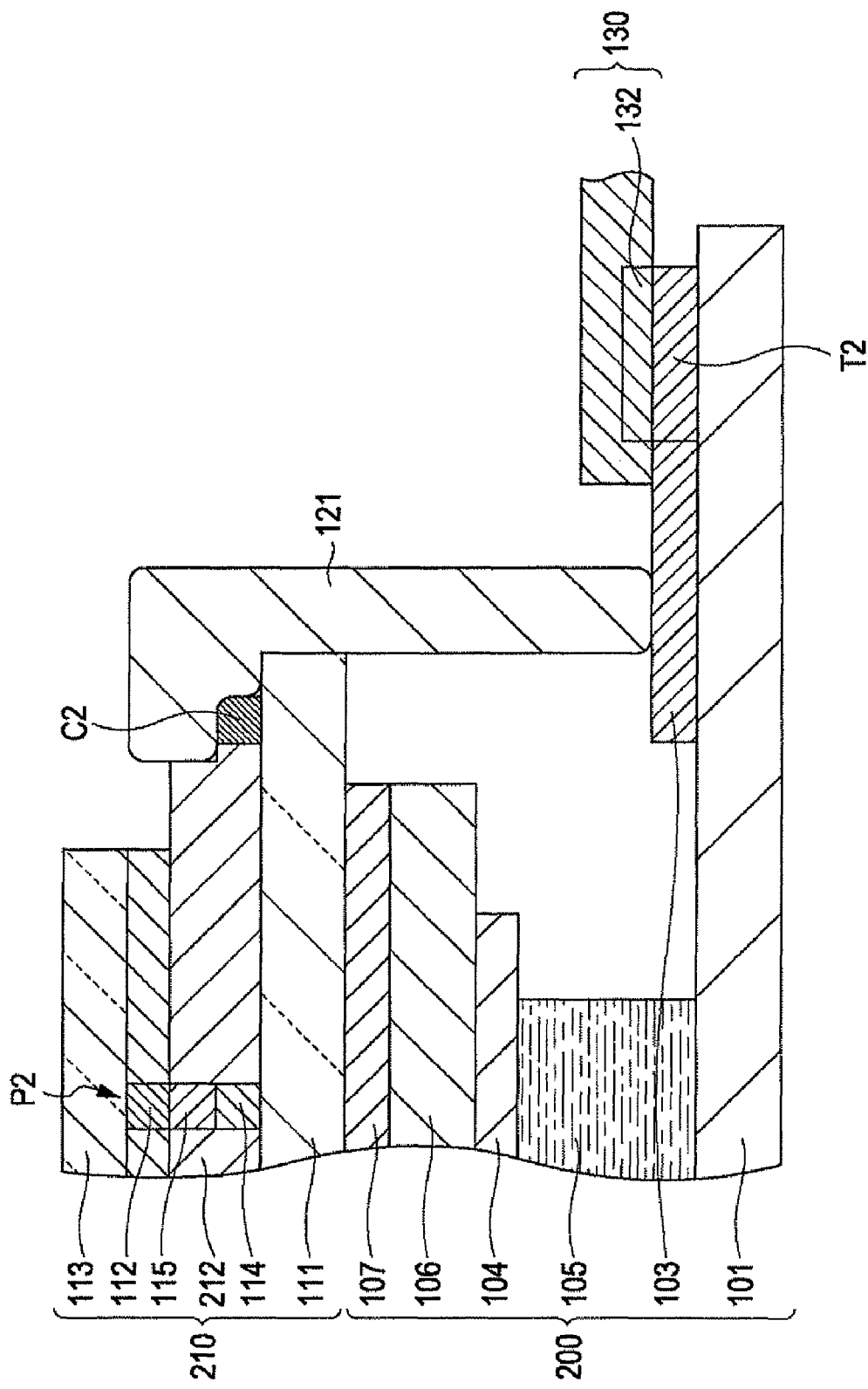
FIG. 9 is a sectional view taken along the line IX-IX of FIG. 7.

FIG. 7 is a plan view that schematically illustrates an example of the configuration of a display device 20 according to a second embodiment of the invention. FIG. 8 is a sectional view taken along the line VIII-VIII of FIG. 7. FIG. 9 is a sectional view taken along the line IX-IX of FIG. 7. As illustrated in these drawings, the display device 20 is provided with a reflection type display medium 200, an illuminator 210, the electric conductors 120 and 121, and the FPC 130. The display medium 200 utilizes reflected light for displaying an image. The illuminator 210 irradiates light to the display medium 200. Each of the electric conductors 120 and 121 provides connection like a bridge between the display medium 200 and the illuminator 210. The FPC 130 is connected to the display medium 200.

The configuration of the display medium 200 is different from that of the display medium 100 in the following points; firstly, the display medium 200 is not provided with the relay wire 102 but provided with a relay wire 202; secondly, the display medium 200 is provided with electric conductors 204 and 205. The electric conductors 204 and 205 connect the common electrode 104 and the relay wire 202 electrically. That is, in the structure of the display medium 200, the terminal T1 is electrically connected to the common electrode 104.

The illuminator 210 is provided with the light-emitting elements P2. As illustrated in FIGS. 2 and 3, in the structure of the light-emitting element P1, the positive electrode 112, the light-emitting layer 115, and the negative electrode 114 are laid in the order of appearance herein as viewed from the illumination substrate 111 toward the sealing substrate 113. In contrast, in the structure of the light-emitting element P2, the negative electrode 114, the light-emitting layer 115, and the positive electrode 112 are laid in the order of appearance herein as viewed from the illumination substrate 111 toward the sealing substrate 113 as illustrated in FIGS. 8 and 9. Because of such a reversed layer structure, the illuminator 210 includes a positive electrode wire 211, which has a shape different from that of the positive electrode wire 116, as a substitute for the positive electrode wire 116. In addition, the illuminator 210 includes a negative electrode wire 212, which has a shape different from that of the negative electrode wire 117, as a substitute for the negative electrode wire 117.

As understood from the above explanation, in the structure of the display device 20, the terminal 131 of the FPC 130 is electrically connected to the positive electrode 112 of the illuminator 210. In addition, the terminal 132 of the FPC 130 is electrically connected to the negative electrode 114 of the illuminator 210. For the power driving of the display device 20, a power potential for the common electrode 104 (i.e., common voltage level Vcom) is supplied to the common electrode 104 and the positive electrode 112 via the terminal 131. Accordingly, in the operation of the display device 20, it is possible to illuminate the display medium 200 by means of the illuminator 210 with moderate brightness by supplying a power potential that has a potential difference of five to ten volts [V] from the common voltage level Vcom to the negative electrode 114 via the terminal 132.

As explained above, the relay wire 202 that is used for supplying power to the liquid crystal elements LC is used also for supplying power to the light-emitting elements P2. Therefore, the display device 20 makes it possible to decrease the number of dedicated wires used only for the purpose of supplying power to the illuminator 210 and to decrease the number of power supplies required. As a modification example of the present embodiment, a power potential for the display medium 200 other than the common voltage level Vcom may be used also as a power potential for the illuminator 210. Examples of such an alternative power potential that can double as a power potential for the illuminator 210 are: a high voltage level VDD (e.g., 5V) of a data signal (e.g., digital signal) that is supplied to a control circuit, a high voltage level VHH (e.g., 15V) of a vertical scanning signal in matrix driving, and the like.

Third Embodiment

Figure 10:
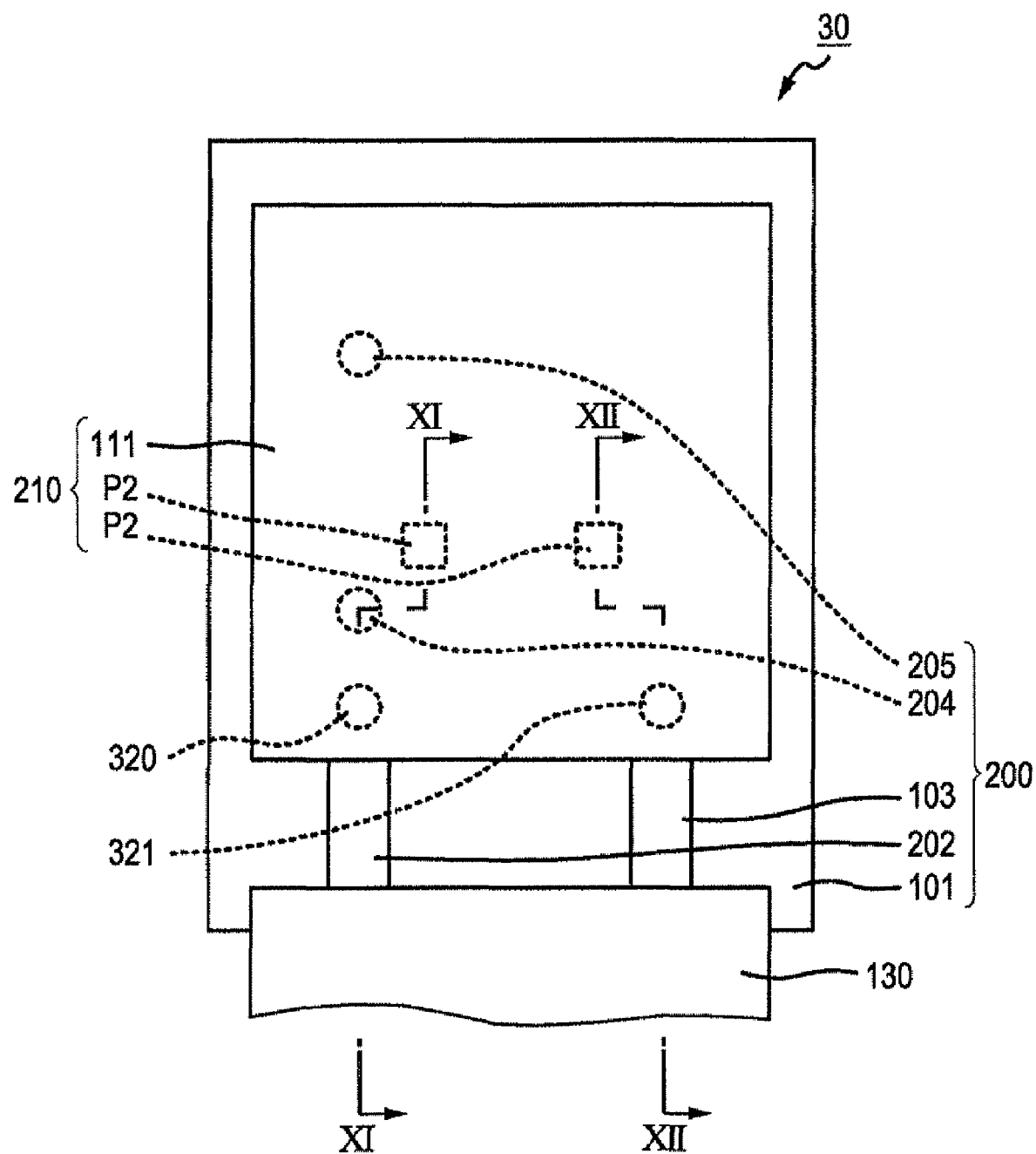
FIG. 10 is a plan view that schematically illustrates an example of the configuration of a display device according to a third embodiment of the invention.
Figure 11:
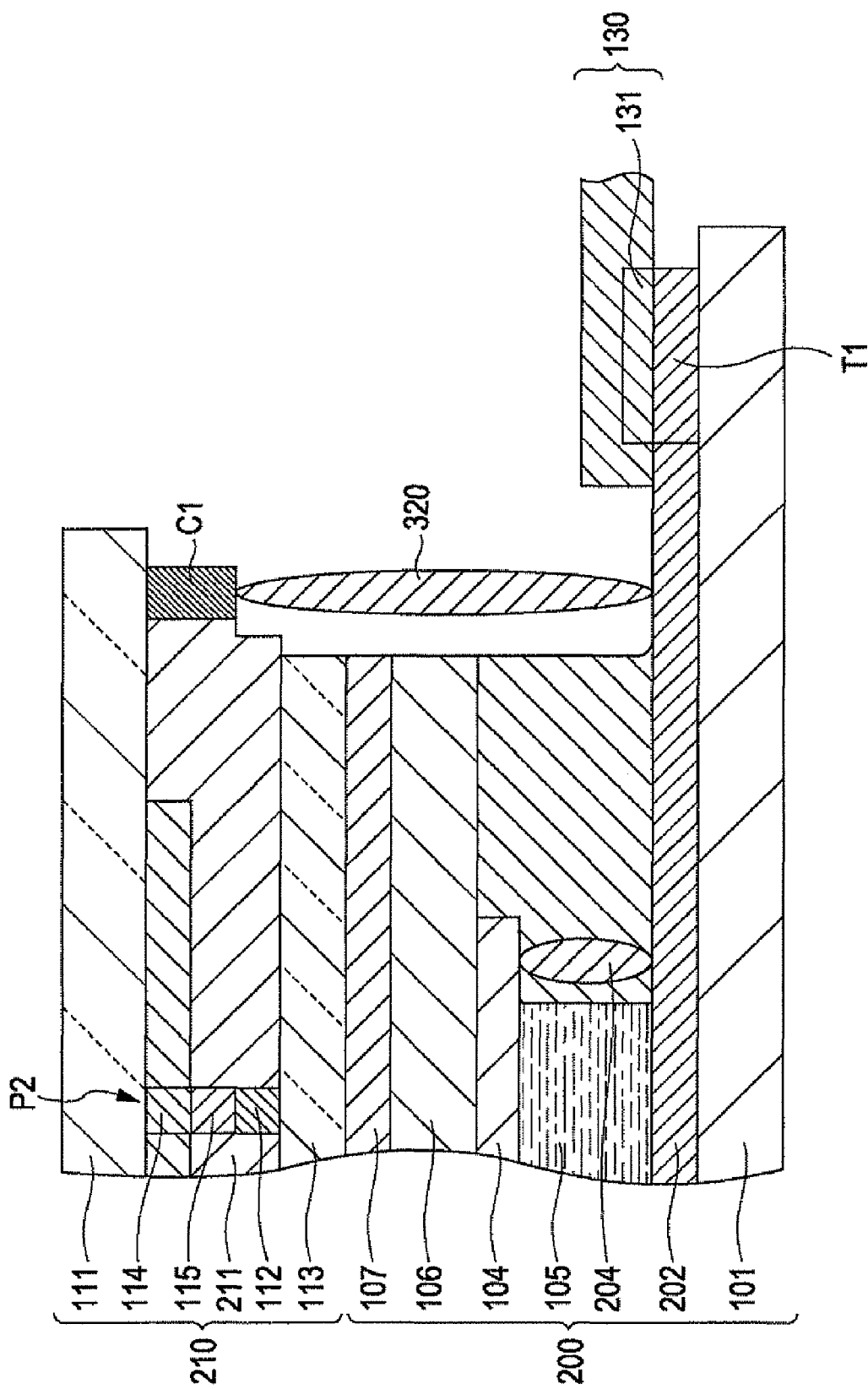
FIG. 11 is a sectional view taken along the line XI-XI of FIG. 10.

FIG. 10 is a plan view that schematically illustrates an example of the configuration of a display device 30 according to a third embodiment of the invention, FIG. 11 is a sectional view taken along the line XI-XI of FIG. 10. FIG. 12 is a sectional view taken along the line XII-XII of FIG. 10. As illustrated in these drawings, the display device 30 is provided with the display medium 200, the illuminator 210, electric conductors 320 and 321, and the FPC 130. The electric conductor 320 is made of silver, which is the same material as that of the electric conductor 120. The electric conductor 320 provides electric connection between the relay wire 202 and the connection portion C1. The electric conductor 321 is also made of silver, the same material as that of the electric conductor 121. The electric conductor 321 provides electric connection between the relay wire 103 and the connection portion C2. Having the above structure, the display device 30 offers the same advantage as that of the display device 20.

Figure 13A:
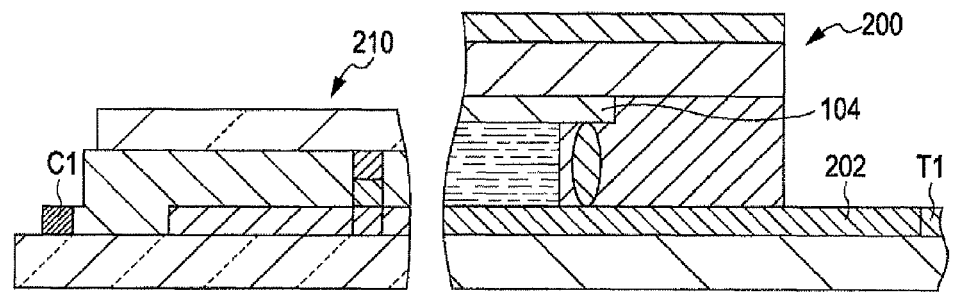
FIGS. 13A, 13B, and 13C show a fifth process, a sixth process, and a seventh process of the manufacturing method, respectively.
Figure 13B:
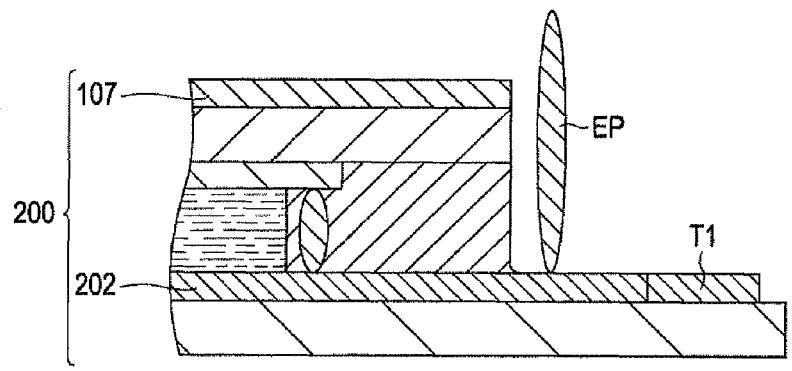
Figure 13C:
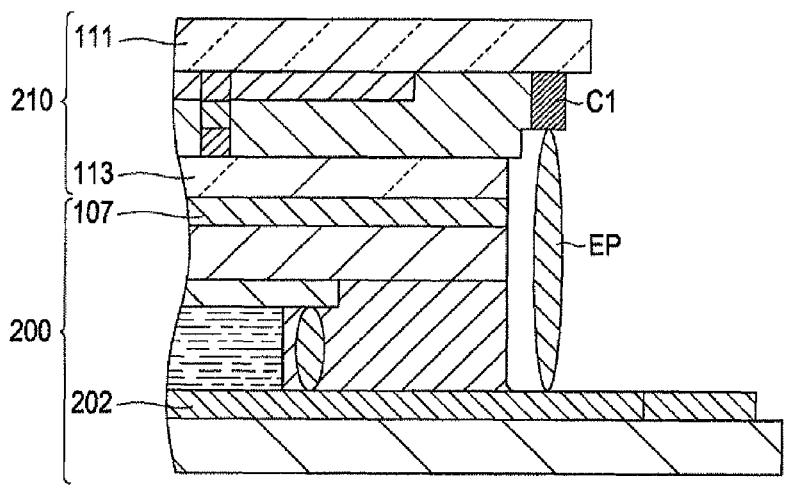

FIG. 13 is a set of sectional views that schematically illustrates an example of a method for manufacturing the display device 30. FIG. 13A shows a first process (numbered as a fifth process herein) of the manufacturing method. FIGS. 13B and 13C show a sixth process and a seventh process thereof, respectively. Each of the sectional views 13A, 13B, and 13C shows a cross section taken along the line XI-XI of FIG. 10. In the fifth process, the display medium 200 is manufactured in such a way as to expose the relay wire 202, the relay wire 103, the terminal T1, and the terminal T2. In addition, in the fifth step, the illuminator 210 is manufactured in such a way as to expose the connection portions C1 and C2. Next, in the sixth process, the conductive paste EP is applied onto the relay wires 202 and 103. In this conductive-paste-application process, the conductive paste EP is applied to form a mound that is high enough so that the conductive paste EP is in contact with the connection portion when the display medium 200 and the illuminator 210 are bonded to each other.

Next, in the seventh process, the polarizing plate 107 of the display medium 200 is bonded to the sealing substrate 113 of the illuminator 210 for the attachment of the display medium 200 to the illuminator 210 or vice versa. In this bonding process, the display medium 200 and the illuminator 210 are set and aligned as follows. The connection portions C1 and C2 lie on a display-medium-side surface of the illumination substrate 111, that is, a surface that is closer to the display medium 200. The relay wire 202 lies on an illuminator-side surface of the display substrate 101, which is a surface that is closer to the illuminator 210. The relay wire 103 also lies on the illuminator-side surface of the display substrate 101. The connection portion C1 and the relay wire 202 face each other with the conductive paste EP being sandwiched therebetween. As a result of the bonding of the display medium 200 to the illuminator 210 in the seventh process as explained above, the connection portion C1 is electrically connected to the relay wire 202. In addition, the connection portion C2 is electrically connected to the relay wire 103.

Thereafter, in an eighth process, the conductive paste EP is solidified to form the electric conductors 320 and 321 concurrently. The display device 30 is manufactured through these processes. In the structure of the display device 30, both of the connection portions C1 and C2 are provided on the display-medium-side surface of the illumination substrate 111, that is, a surface closer to the display medium 200. Both of the relay wires 202 and 103 are provided on the illuminator-side surface of the display substrate 101, that is, a surface closer to the illuminator 210. With such a structure, as explained above, it is possible to form the electric conductors 320 and 321 concurrently.

The display device 30 offers an additional advantage in that a distance between the relay wire 202 and the connection portion C1 as well as a distance between the relay wire 103 and the connection portion C2 can be shortened. For example, as a modified structure of the display device 30, the lower surface of the connection portion C1 illustrated in FIG. 11 may be positioned below the upper surface of the sealing substrate 113. The lower surface of the connection portion C2 illustrated in FIG. 12 may be positioned below the upper surface of the sealing substrate 113. As described above, since the display device 30 enables the above distances to be shortened, it is possible to reduce the amount of use of the conductive paste EP and to decrease the values of resistance of the electric conductors 320 and 321. As the resistance value of the electric conductor 320 decreases, a power potential that is supplied to the positive electrode 112 can be lowered. Therefore, a display device according to the present embodiment of the invention achieves a reduction in power consumption.

Fourth Embodiment

Figure 14:
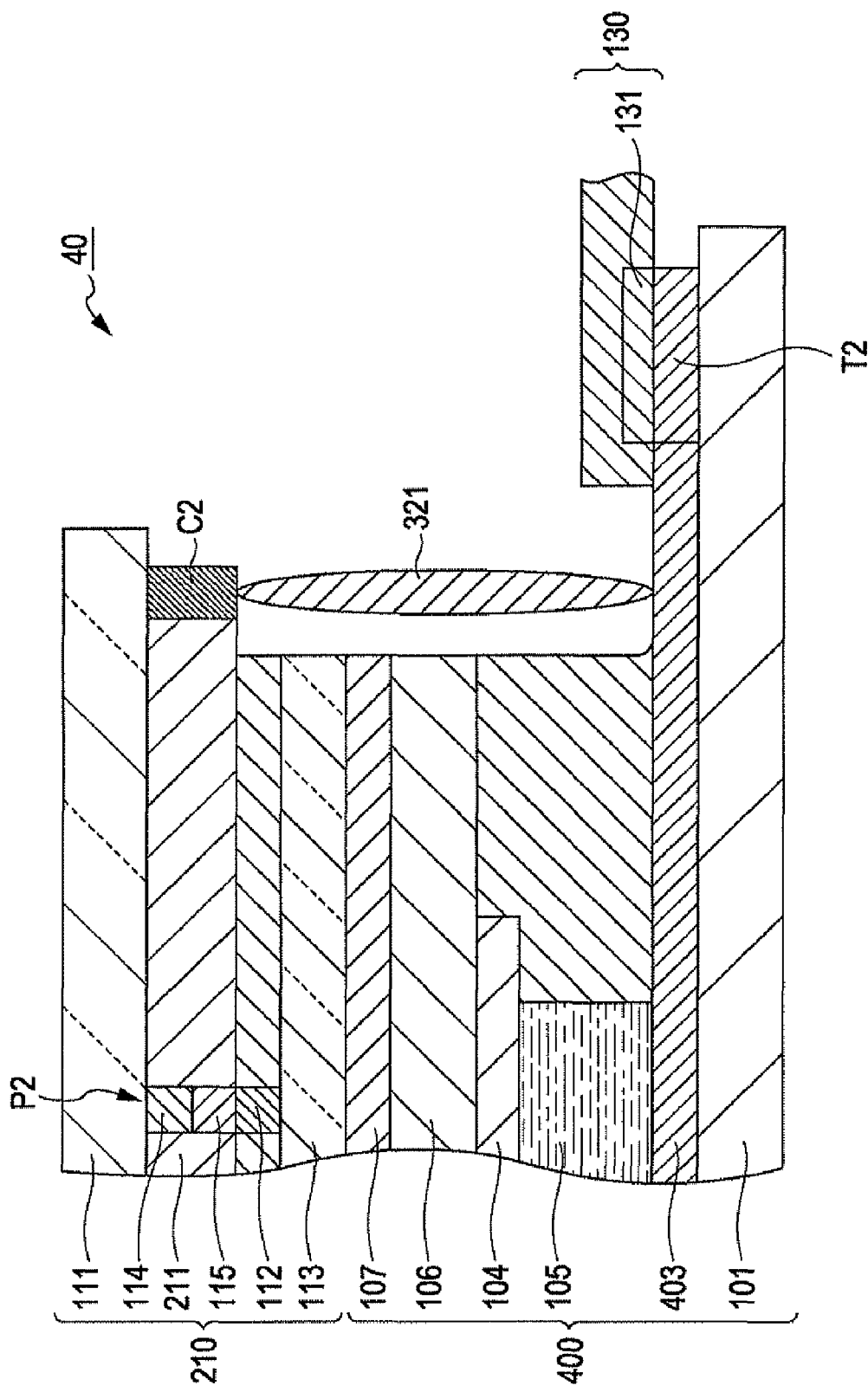
FIG. 14 is a sectional view that schematically illustrates an example of the structure of a display device according to a fourth embodiment of the invention.

FIG. 14 is a sectional view that schematically illustrates an example of the structure of a display device 40 according to a fourth embodiment of the invention. The configuration of the display device 40 is different from that of the display device 30 in that the display device 40 is not provided with the display medium 200 but provided with a display medium 400, which is the sole difference therebetween. The configuration of the display medium 400 is different from that of the display medium 200 in that the display medium 400 is not provided with the relay wire 103 but provided with a relay wire 403, which is the sole difference therebetween.

The relay wire 403 is electrically connected to control circuits (not shown in the drawing) that drive the respective liquid crystal elements LC. The relay wire 403 is used for supplying a power potential to the control circuit (i.e., ground potential Vss). Since the relay wire 403 electrically connects the terminal T2 and the connection portion C2, the relay wire 403 is used for supplying a power potential to the negative electrode 114, too. That is, the relay wire 403 that is used for supplying power to control circuits is used also for supplying power to the light-emitting elements P2. Therefore, the display device 40 makes it possible to decrease the number of dedicated wires used only for the purpose of supplying power to the illuminator 210 and to decrease the number of power supplies required.

As understood from the above explanation, in the operation of the display device 40, the common voltage level Vcom is applied to the positive electrode 112 whereas the ground potential Vss is applied to the negative electrode 114. The common voltage level Vcom is typically 7V. The ground potential Vss is 0V. Therefore, a potential difference between the positive electrode 112 and the negative electrode 114 is 7V, which falls within the aforementioned appropriate potential difference range. Therefore, the display device 40 can illuminate the display medium 400 by means of the illuminator 210 with moderate brightness.

Fifth Embodiment

Figure 15:
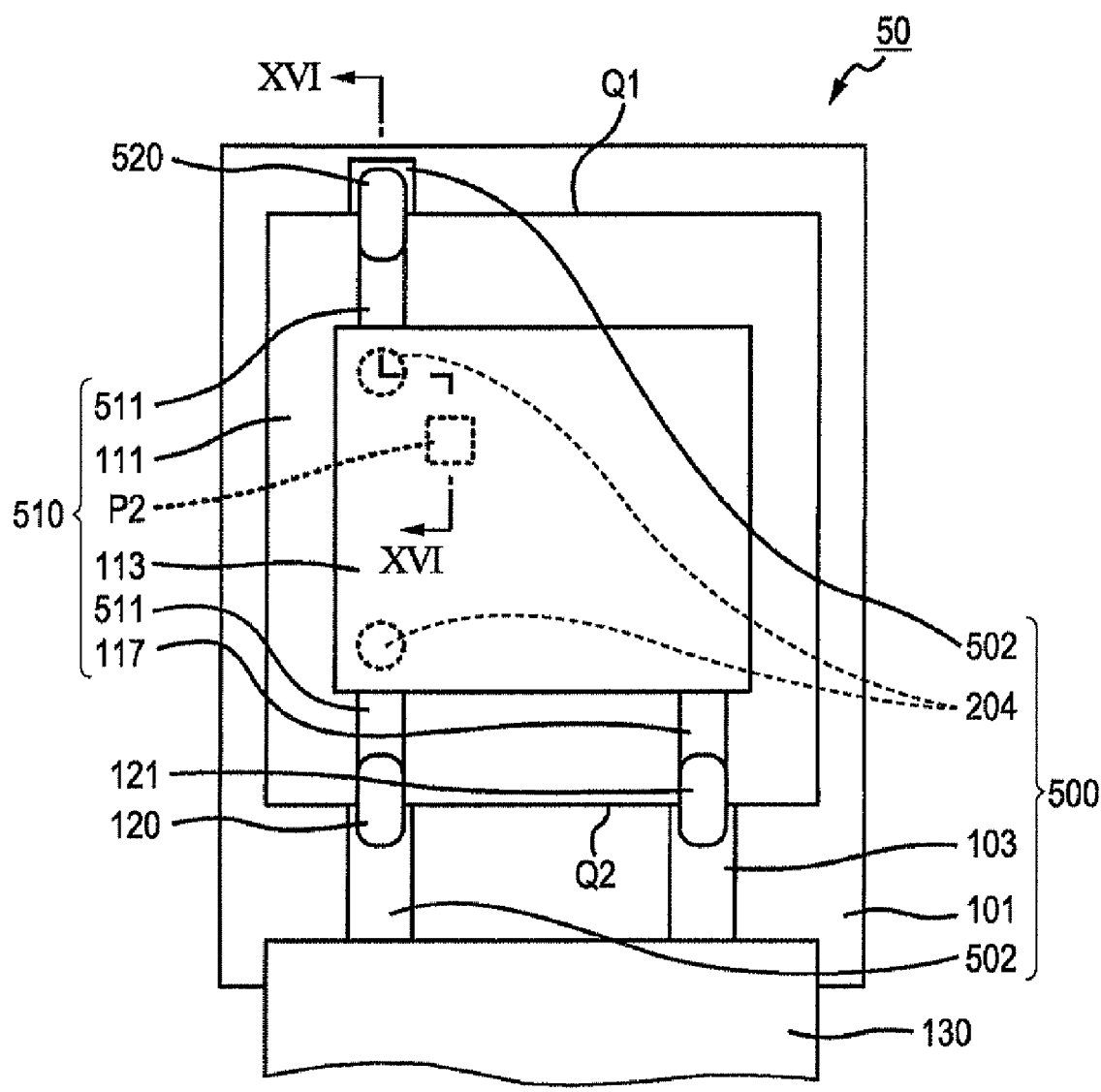
FIG. 15 is a plan view that schematically illustrates an example of the configuration of a display device according to a fifth embodiment of the invention.
Figure 16:
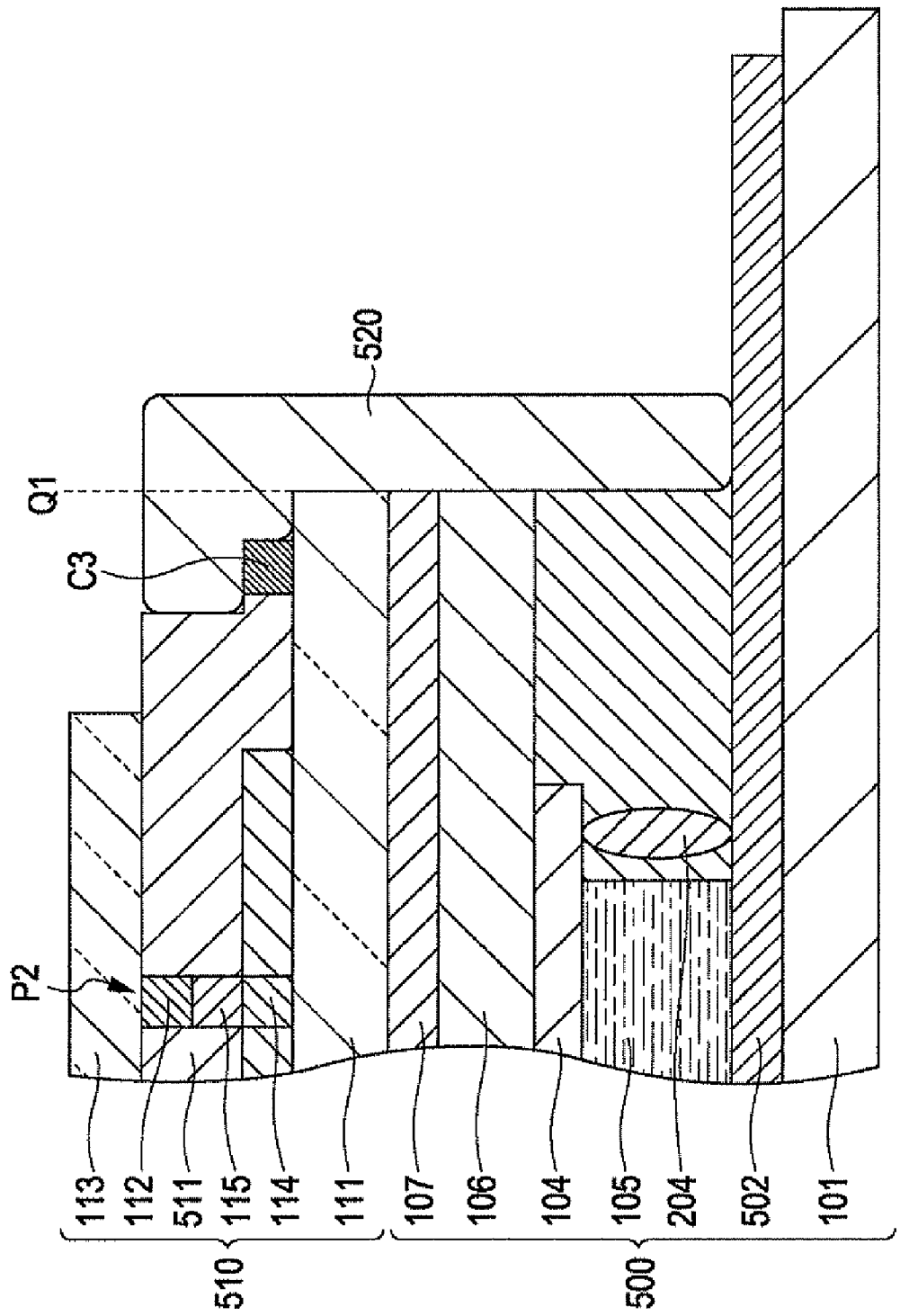
FIG. 16 is a sectional view taken along the line XVI-XVI of FIG. 15.

FIG. 15 is a plan view that schematically illustrates an example of the configuration of a display device 50 according to a fifth embodiment of the invention. FIG. 16 is a sectional view taken along the line XVI-XVI of FIG. 15. The configuration of the display device 50 is different from that of the display device 20 in the following points; firstly, the display device 50 is not provided with the display medium 200 but provided with a display medium 500; secondly, the display device 50 is not provided with the illuminator 210 but provided with an illuminator 510; thirdly, the display device 50 is provided with an additional electric conductor 520.

The configuration of the display medium 500 is different from that of the display medium 200 in that the display medium 500 is not provided with the relay wire 202 but provided with a relay wire 502, which is the sole difference therebetween. The difference between the relay wire 502 and the relay wire 202 lies in the length thereof. Specifically, as illustrated in FIG. 15, the relay wire 502 extends from the neighborhood of a connection end of the FPC 130 toward the opposite side. A part of the relay wire 502 is located under the illuminator 510. The relay wire 502 extends beyond an opposite edge Q1 of the illumination substrate 111, which means that the front end of the relay wire 502 is located outside the opposite edge Q1. The opposite edge Q1 is one of four edges of the illumination substrate 111 that is opposite an FPC-side edge. The FPC-side edge is an edge that is the closest to the FPC 130 among the four edges.

The configuration of the illuminator 510 is different from that of the illuminator 210 in the following points; firstly, the illuminator 510 is provided with an additional connection portion C3; secondly, the illuminator 510 is not provided with the positive electrode wire 211 but provided with a positive electrode wire 511. Among the four edges of the illumination substrate 111, the FPC-side edge, which is denoted as Q2, is the closest to the connection portion C1 (a first connection portion) and the connection portion C2. The opposite edge Q1 of the illumination substrate 111 is the closest to the connection portion C3 (a second connection portion) among the four edges thereof. The positive electrode wire 511 connects the connection portion C1, the connection portion C3, and the positive electrode 112 electrically.

The electric conductor 520 is made of silver. The electric conductor 520 provides electric connection between the relay wire 502 and the connection portion C3. That is, the positive electrode wire 511 is electrically connected to the relay wire 502 not only through the connection portion C1 and the electric conductor 120 but also through the connection portion C3 and the electric conductor 520. Generally, there is a risk of irregular brightness due to a voltage drop in a case where a positive electrode wire is routed as long wiring in the structure of an illuminator. In contrast, in the structure of the display device 50, the positive electrode wire 511 and the relay wire 502 are electrically connected to each other via electric conductors (i.e., the electric conductors 120 and 520) each of which extends across and outside the corresponding one of a pair of opposite sides (i.e., the edges Q1 and Q2) of the illumination substrate 111. With such a structure, it is possible to suppress a voltage drop, which results in a reduction in uneven brightness.

Variation Examples

The foregoing embodiments of the invention may be combined with each other or one another to configure a display device. However, it is necessary to ensure that a potential difference between the positive electrode 112 of a light-emitting element and the negative electrode 114 thereof falls within the aforementioned appropriate potential difference range, that is, from 5V to 10V. Especially when one power potential is used both as a power potential for a display medium and as a power potential for an illuminator, it is necessary to select an appropriate combination of power voltage levels that ensures that a potential difference between the positive electrode 112 and the negative electrode 114 falls within the appropriate potential difference range (from 5V to 10V) because the power potential that can be supplied to the illuminator is limited. Besides a combination of the common voltage level Vcom (e.g., 7V) and the ground potential Vss (e.g., 0V), which is described in the foregoing embodiment, the following combinations are examples of appropriate combinations: the high voltage level VDD (e.g., 5V) of a data signal and the ground potential Vss (e.g., 0V), the high voltage level VHH (e.g., 15V) of a vertical scanning signal and the common voltage level Vcom (e.g., 7V), and the high voltage level VHH (e.g., 15V) of a vertical scanning signal and the high voltage level VDD (e.g., 5V) of a data signal.

A plurality of terminals to which the same power potential is supplied may be provided on a display medium. In such a configuration, a relay wire and an electric conductor may be provided in such a way as to electrically connect at least two of these terminals to a positive electrode or a negative electrode. Or, a relay wire and an electric conductor may be provided in such a way as to electrically connect one of these terminals to a positive electrode or a negative electrode.

In a bonded structure, an illumination substrate may be interposed between a certain connection portion and a certain relay wire whereas another connection portion and another relay wire may face each other with an electric conductor being sandwiched therebetween. Conductive paste other than silver paste may be used for manufacturing a display device. A conductive material other than silver may be used as the material of an electric conductor. A display device may be manufactured without the use of conductive paste. A device that requires three or more power potentials (the number of types of required power potentials is three or greater) may be adopted as a light emitter. A device that is provided with only one light-emitting element may be adopted as a light emitter. As alternative methods for sealing light-emitting elements in the structure of an illuminator, various methods can be adopted besides a can-type encapsulation method, which uses a sealing substrate as described in the foregoing embodiment of the invention. For example, a film-type encapsulation method may be adopted.

A transmission type liquid crystal display device may be used as a display medium. The layer structure of a transmissive display medium does not include the reflecting layer 109 illustrated in FIG. 4. In addition, the display substrate 101 of the transmissive display medium is made of a light-transmissive material, which has optical transparency, such as glass or the like. Besides the liquid crystal element LC, various types of an element can be adopted as an electro-optical element that performs control on incident light according to electric energy supplied thereto. For example, a liquid crystal element to which a voltage is applied in a direction that is not the same as the direction of the layer thickness of liquid crystal may be adopted. As another example, a digital micro mirror device (DMD) (registered trademark) may be adopted. Besides an organic EL element, various types of an element can be adopted as a light-emitting element that emits light with the use of power supplied between power electrodes. For example, a light-emitting diode (LED) or a laser diode (LD) may be adopted.

Application Examples

Figure 17:
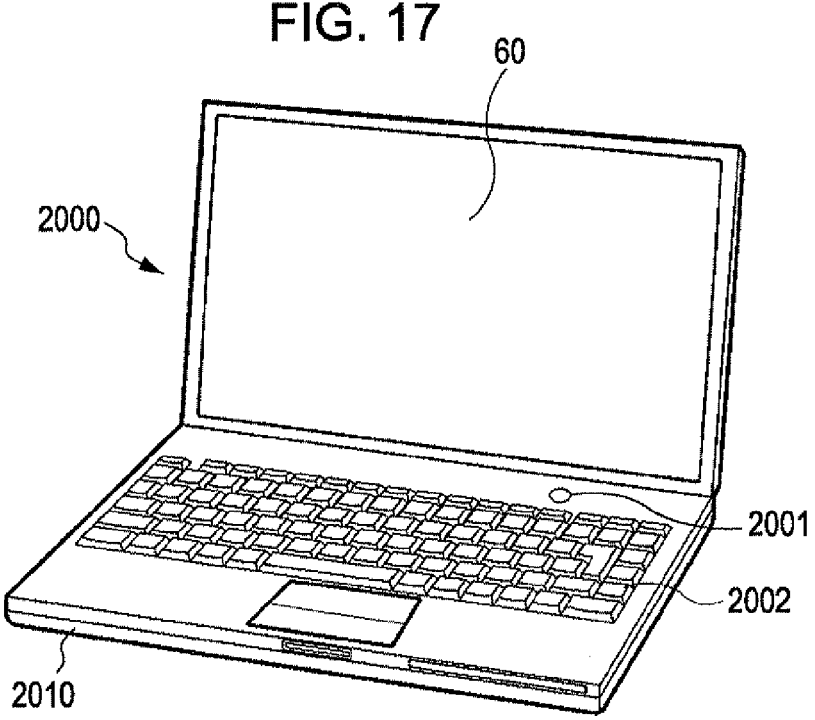
FIG. 17 is a perspective view that schematically illustrates an example of an electronic apparatus according to an exemplary embodiment of the invention.
Figure 18:
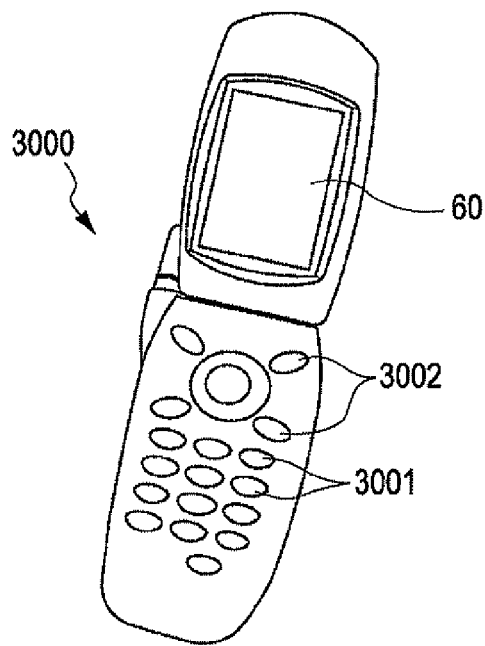
FIG. 18 is a perspective view that schematically illustrates another example of an electronic apparatus according to an exemplary embodiment of the invention.
Figure 19:
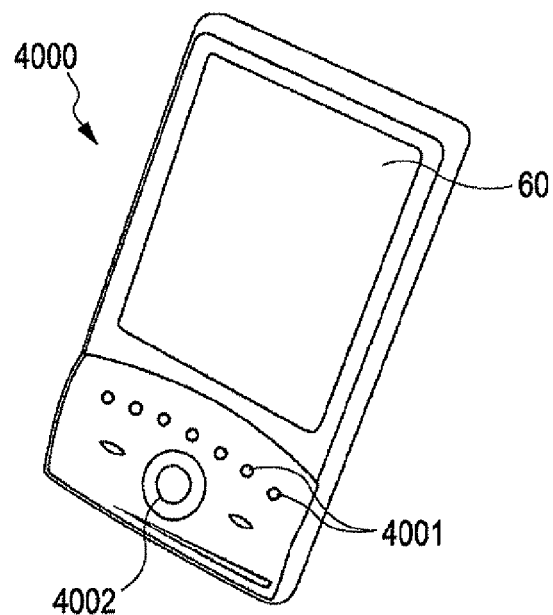
FIG. 19 is a perspective view that schematically illustrates still another example of an electronic apparatus according to an exemplary embodiment of the invention.

Next, an explanation is given below of a few examples of a variety of electronic apparatuses to which a display device according to exemplary embodiments of the invention is applicable. In the following explanation, a display device according to any of the foregoing exemplary embodiments of the invention inclusive of their variations, modifications, and the like is referred to as a "display device 60". FIG. 17 is a perspective view that schematically illustrates an example of the configuration of a mobile personal computer in which the display device 60 is built as a display unit. A personal computer 2000 includes the display device 60, which functions as the display unit, and a main assembly 2010. The main assembly 2010 is provided with a power switch 2001 and a keyboard 2002. FIG. 18 is a perspective view that schematically illustrates an example of the configuration of a mobile phone to which the display device 60 is applied. A mobile phone 3000 is provided with a plurality of manual operation buttons 3001, scroll buttons 3002, and the display device 60 functioning as a display unit thereof. When a user operates the scroll buttons 3002, content displayed on the screen of the display device 60 is scrolled. FIG. 19 is a perspective view that schematically illustrates an example of the configuration of a personal digital assistant (PDA) to which the display device 60 is applied. A personal digital assistant 4000 is provided with a plurality of manual operation buttons 4001, a power switch 4002, and the display device 60 functioning as a display unit thereof. Among a variety of electronic apparatuses to which a display device according to an aspect of the present invention is applicable are, besides the specific examples illustrated in FIGS. 17, 18, and 19, a television, a portable medium player, a digital still camera, a video camera, a car navigation device, an electronic personal organizer, an electronic paper, an electronic calculator, a word processor, a workstation, a videophone, a scanner, a copier, a video player, and so forth.

What is claimed is:

1. A display device comprising:
an illumination medium comprising:
- a light-emitting element that includes a first electrode and a second electrode and emits light based on power supplied between the first electrode and the second electrode;
- a connection portion that is electrically connected to at least one of the first electrode and the second electrode; and
- an illumination substrate on or over which the light-emitting element and the connection portion are formed, the illumination substrate interposed between the connection portion and the relay wiring;

a display medium comprising:
- a terminal;
- a relay wiring that is electrically connected to the terminal; and
- an electro-optical element that controls light that is irradiated by and comes from the illumination medium based on electric energy supplied to the electro-optical element; and
- a conductor that electrically connects the relay wiring and the connection portion.

2. The display device of claim 1, the number of the electro-optical element is more than one, the display medium further comprising:
a common electrode that is common to the plurality of electro-optical elements, the relay wiring electrically connected to the common electrode to supply power to the electro-optical elements.

3. An electronic apparatus that is provided with the display device of claim 1.

4. A display device comprising:
an illumination medium including:
- a light-emitting element having:
  - a first electrode; and
  - a second electrode, the light-emitting element configured to emit a light in response to a supply of power between the first electrode and the second electrode; and
- a connection portion electrically connected to at least one of the first electrode and the second electrode; and
- an illumination substrate on or over which the light-emitting element and the connection portion are formed, the illumination substrate interposed between the connection portion and the relay wiring;

a display medium including:
- an electro-optical element having a common electrode and configured to control light irradiated by the illumination medium in response to an electric energy supplied to the electro-optical element; and a relay wiring electrically connected to the common electrode of the electro-optical element; and a first conductor electrically connecting the relay wiring and the connection portion.

5. A display device comprising:
an illumination medium comprising:
- a light-emitting element that includes a first electrode and a second electrode and emits light based on power supplied between the first electrode and the second electrode; and
- a connection portion that is electrically connected to at least one of the first electrode and the second electrode;

a display medium comprising:
- a terminal;
- a relay wiring that is electrically connected to the terminal;
- a plurality of electro-optical elements that control light that are irradiated by and come from the illumination medium based on electric energy supplied to the plurality of electro-optical elements; and
- a common electrode that is common to the plurality of electro-optical elements, the relay wiring electrically connected to the common electrode to supply power to the plurality of electro-optical elements; and a conductor that electrically connects the relay wiring and the connection portion.

* * * * *